(12) United States Patent
Martin et al.

(10) Patent No.: US 6,817,304 B2
(45) Date of Patent: Nov. 16, 2004

(54) PROCESS FOR GENERATING HEAT TO REDUCE THE EMISSION OF OXIDES OF SULPHUR AND REDUCE ADSORBENT CONSUMPTION

(75) Inventors: Gérard H. Martin, Saint Genis Laval (FR); Etienne Lebas, Seyssuel (FR)

(73) Assignee: Institut Francais du Petrole, Rueill-Malmaison ( * ) Notice: Subject to any disclaimer, the term of this patent is extended or adjusted under 35 U.S.C. 154(b) by 254 days.

(21) Appl. No.: 09/942,595

(22) Filed: Aug. 31, 2001

(65) Prior Publication Data

US 2002/0028172 A1 Mar. 7, 2002

(30) Foreign Application Priority Data

Sep. 1, 2000 (FR) .............................. 00 11258

(51) Int. Cl.[7] .............................. C01B 17/56; F23J 15/00
(52) U.S. Cl. .................. 110/345; 110/216; 423/244.01; 423/244.07; 423/244.08
(58) Field of Search ................................ 422/168, 213, 422/232; 110/203, 216, 345; 423/243.08, 244.07, 244.08, 244.01

(56) References Cited

U.S. PATENT DOCUMENTS

| 4,273,750 A | | 6/1981 | Hollett ....................... 423/244 |
|---|---|---|---|
| 4,679,511 A | * | 7/1987 | Holmes et al. ............. 110/216 |
| 4,732,113 A | * | 3/1988 | Engstrom .................. 122/4 D |
| 4,934,281 A | * | 6/1990 | Engstrom et al. ........... 110/216 |
| 5,216,966 A | | 6/1993 | Martin ....................... 110/216 |
| 6,165,421 A | | 12/2000 | Martin et al. ................ 422/171 |

FOREIGN PATENT DOCUMENTS

| AT | 399214 B | | 4/1995 |
|---|---|---|---|
| EP | 0181820 A1 | | 5/1986 |
| FR | 2583305 | | 12/1986 |
| FR | 2636720 A1 | | 3/1990 |
| FR | 2671855 A1 | | 7/1992 |
| FR | 2748402 A1 | | 11/1997 |
| WO | WO 97/43032 | * | 11/1997 ........... B01D/53/83 |

OTHER PUBLICATIONS

Derwent WPI Abstract of FR 2583305 Dec. 19, 1986.
Derwent WPI Abstract of EP 0181820 May 21, 1986.
Derwent WPI Abstract of FR 2636720 Mar. 23, 1990.

* cited by examiner

Primary Examiner—Wayne A. Langel
(74) Attorney, Agent, or Firm—Millen, White, Zelano, Branigan, P.C.

(57) ABSTRACT

For reducing emissions of oxides of sulphur:

a) a sulphur-containing fuel is burned in a combustion zone comprising a heat exchange zone in which at least a portion of the heat is extracted, and effluents or combustion fumes are recovered at a temperature in the range 800° C. to 1200° C.;
b) the fumes resulting from said combustion, charged with oxides of sulphur, traverse a space for supplying and distributing the fumes to a desulphurisation apparatus functioning with an internal recycle of a solid oxide of sulphur adsorbent;
c) the adsorbent is injected into said space;
d) the fumes are caused to enter said apparatus;
e) the fumes are caused to penetrate into a convection exchange zone and at least a portion of the heat is extracted from said fumes;
f) the mixture resulting from steps b) and c) is separated in a gas/solid separation zone and a portion of the gaseous effluent that has been freed of the major portion of the oxides of sulphur and at least partially cooled is evacuated, and said adsorbent particles comprising said sulphur-containing compounds are evacuated.

22 Claims, 3 Drawing Sheets

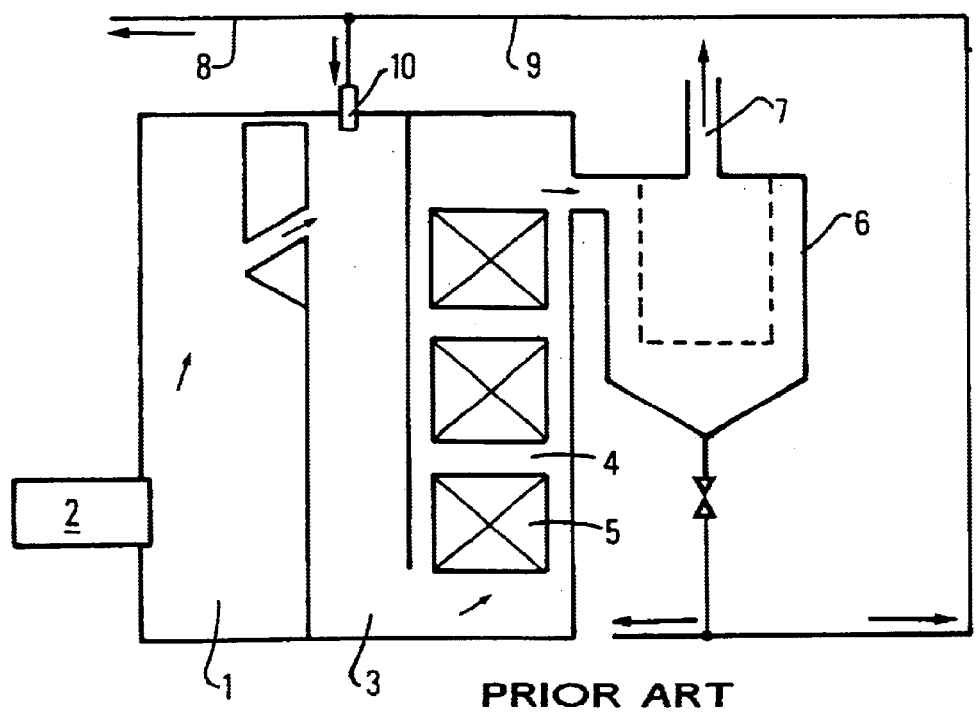
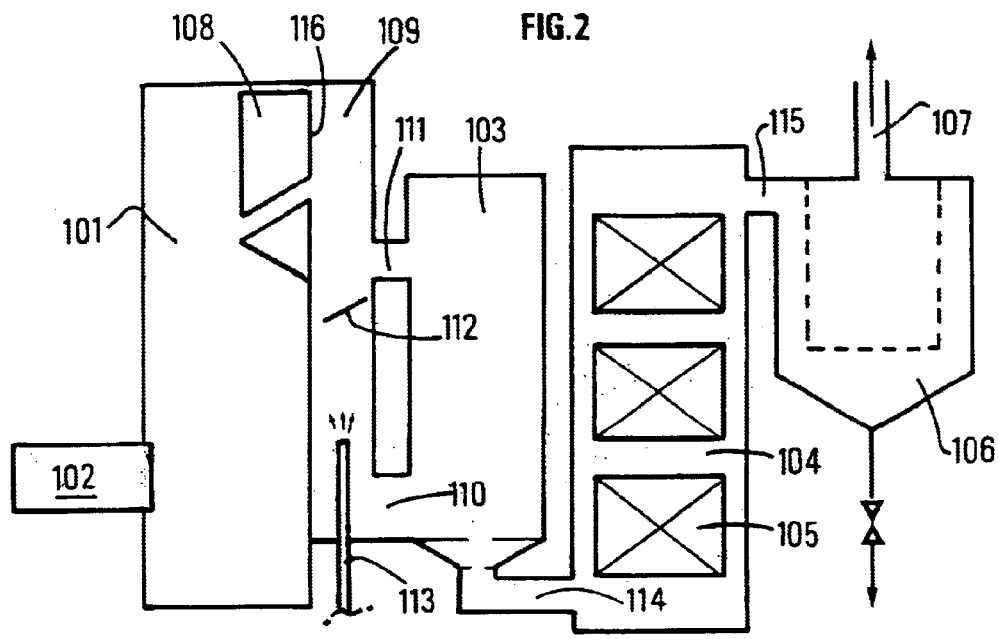

PROCESS FOR GENERATING HEAT TO REDUCE THE EMISSION OF OXIDES OF SULPHUR AND REDUCE ADSORBENT CONSUMPTION

The present invention relates to a process for generating heat from combustion of a fuel containing sulphur, with reduced emissions of oxides of sulphur.

For a number of years, regulations limiting the emission of oxides of sulphur by the gaseous effluents from heat generators have been tightened; they forbid the use of fuels with high sulphur contents without subsequent treatment of the oxides of sulphur contained in the combustion fumes. The combustion of certain residues or mined materials, such as certain lignite coals, or petroleum residues and heavy fuels from refining processes, however, have a number of economic advantages. A variety of processes and/or apparatus described in the prior art can reduce the emissions of oxides of sulphur and more particularly sulphur dioxide from a heat generator by treating the combustion fumes before their discharge.

As an example, certain heat generators comprise a combustion chamber, at least one heat exchange zone, a desulphurisation chamber comprising at least one means for injecting a solid adsorbent, this chamber communicating with a convection exchange zone, then a separation chamber connected to said convection exchange zone (FIG. 1). The separation chamber comprises at least one outlet for used adsorbent and at least one outlet for purified gas. French patents FR-A-2 636 720 and FR-A-2 664 022 describe a process and apparatus for generating heat comprising desulphurising effluents with adsorbent particles with a fine particle size in a transported bed. The adsorbent injected into these heat generators essentially consists of a calcitic material that is sent, after partial sulphurisation, to a storage hopper (or final dust collector) generally constituted by a bag filter or an electrostatic filter. That type of generator results in the production of non negligible quantities of used calcitic adsorbent, i.e., sulphated, resulting in non negligible problems as regards storage and/or upgrading of that waste.

In order to limit the quantity of used adsorbent, an improvement to such a process consists of using "regeneratable" adsorbents essentially constituted by magnesian compounds (dolomite, magnesium oxide, magnesium carbonate) as claimed in FR-A-2 692 813.

FR-A-2 671 855 discloses an apparatus using such regeneratable adsorbents by adding an adsorbent regenerating means to the apparatus described above and means for treating the adsorbent and/or regeneration gases arriving from the regeneration means. Such a regeneration means can, for example, be a filter reactor such as that described in FR-A-2 730 424.

External recycling of the adsorbent causes a number of problems, however:
- substantial movement of solid in the heat generator and as a result, substantial over-dimensioning of the apparatus assembly (in particular the size of the electrostatic filter and the heat exchangers in the convection exchange zone);
- wear and clogging in the tubes, necessitating frequent cleaning operations;
- a reduction in the overall energy yield of the heat generator linked to substantial heat losses of the adsorbent in the recycle circuit.

In parallel, the prior art, in particular FR-A-2 748 402, discloses a unit for treating the fumes from incinerating household refuse comprising an internal recycle. That apparatus, known as a CRI reactor, has been characterized and it has been shown that its performance is substantially superior to that of a traditional straight reactor, as regards fume dechlorination. The dechlorination apparatus comprises a peripheral zone for recycling adsorbent, an intermediate zone for desulphurisation and a central zone for evacuating purified fumes to an external convection exchange zone.

The aim of the present invention is to provide a process for integrating a CRI reactor, or any other reactor functioning using the same principal of internal recycling of the adsorbent, to applications other than the treatment of fumes downstream of a household refuse incinerator and to dechlorination. While the nature of the adsorbents, the reaction temperatures and the reaction mechanisms are different, it has been discovered that the CRI reactor surprisingly exhibits a number of advantages and unexpected effects in the field of desulphurising fumes when it is integrated (or juxtaposed, depending on the apparatus) with a heat generator in accordance with the process of the present invention, allowing the adsorbent to be recycled directly to the heat generator and not from the final dust collector:
- the proposed solution can increase desulphurisation yields since, for an identical reaction volume, the fumes are in contact with a much larger quantity of adsorbent than in the traditional straight reactor as claimed in FR-A-2 636 720, FR-A-2 664 022 and FR-A-2 671 855;
- regardless of the configuration of the heat generator, the temperature in the CRI reactor can be kept much more constant than with a straight reactor with an external recycle of the adsorbent from the final filter;
- desulphurisation is less costly from the energy point of view, insofar as the recycled adsorbent is already at the reaction temperature, while in prior art configurations, the adsorbent is at a temperature close to ambient temperature and its injection into the desulphurisation apparatus is accompanied by substantial absorption of the heat transported by the fumes;
- to function in accordance with the process of the present application, the CRI apparatus can be mounted on an existing installation, by means of some modifications in the fume circuit and the exchange surfaces in the boiler. This possibility did not exist in prior patented configurations. Thus, existing installations can be remodeled to integrate the CRI reactor using the present process, to bring them into line with the ever more stringent regulations regarding atmospheric discharges;
- since the adsorbent is recirculated in the desulphurisation apparatus, the flow rates of the adsorbent that traverse the convection exchange zone are low; this means that substantial over-dimensioning, which is always necessary when large quantities of dust are present, can be avoided (for example it is possible to envisage a smaller space between the tubes in the heat exchanger), and it can also limit clogging and wear in the tubes, further limiting cleaning operations;
- a smaller amount of adsorbent is manipulated outside the generator, limiting the size and thus the cost of apparatus for handling solids;
- the solids arriving at the final dust collector of the heat generator (bag filter or electrostatic filter, for example) are only constituted by adsorbent to be regenerated in the case of regeneratable adsorbent or adsorbent to be evacuated in the case of non regeneratable adsorbents, and not a large quantity of adsorbent to be recycled, so the dimensions of the final dust collector can be substantially reduced, saving space and costs.

Clearly, the invention is not limited to the use in the present process of the CRI reactor described in FR-A-2 671 855; the present invention also encompasses using any type of reactor with the same internal adsorbent recycle properties.

In general, the invention concerns a heat generation process with reduced emissions of oxides of sulphur in which:

a) a sulphur-containing fuel is burned in a combustion zone comprising a heat exchange zone in which at least a portion of the heat is extracted, and effluents or combustion fumes are recovered at a temperature in the range 800° C. to 1200° C.;
b) the fumes resulting from said combustion, charged with oxides of sulphur, are caused to traverse a space for supplying and distributing fumes in a desulphurisation apparatus functioning with an internal recycle of a solid oxides of sulphur adsorbent;
c) the adsorbent is injected into said space;
d) the fumes are caused to enter said apparatus;
e) the fumes are caused to penetrate into a convection exchange zone and at least a portion of the heat is extracted from said fumes;
f) the mixture resulting from steps b) and c) is separated in a gas/solid separation zone and a portion of the gaseous effluent that has been freed of the major portion of the oxides of sulphur and at least partially cooled is evacuated, and said adsorbent particles comprising said sulphur-containing compounds are evacuated.

In one embodiment, the desulphurisation apparatus comprises a peripheral zone for recycling adsorbent, an intermediate zone for desulphurisation into which fumes enter tangentially, and a central zone for evacuating fumes.

Advantageously, after step f), at least a portion of said adsorbent particles comprising said sulphur-containing compounds is regenerated and the regenerated adsorbent particles are re-injected into the space acting to supply the desulphurisation apparatus.

It is possible to use a calcitic adsorbent in which case the mean desulphurisation temperature is in the range 800° C. to 110° C.

It is also possible to use a regeneratable magnesian adsorbent, in which case the mean desulphurisation temperature is in the range 700° C. to 1000° C.

Preferably, after combustion step a), the fumes traverse one or more superheated steam banks. In general, the adsorbent flow rates are such that the concentration of solids in the fumes, except for the recycle, is in the range 0.1 to 1000 g/Nm$^3$, the gas recycle ratio in the apparatus is in the range 1% to 50%, and the adsorbent recycle ratio is in the range 1 to 50.

Preferably, the grain size of the adsorbents is in the range 0.1 to 1000 microns, and the density of the adsorbent particles is in the range 100 to 5000 kg/m$^3$.

BRIEF DESCRIPTION OF THE DRAWINGS

The invention will be better understood, and its advantages will become more clear, from the following description, which is given by way of illustration, of two embodiments of an apparatus functioning using the process of the present invention.

FIG. 1 shows an example of a prior art heat generator.

FIGS. 2, 3 and 4 are different views of a first embodiment of an apparatus functioning in accordance with the present process.

Figure 3:
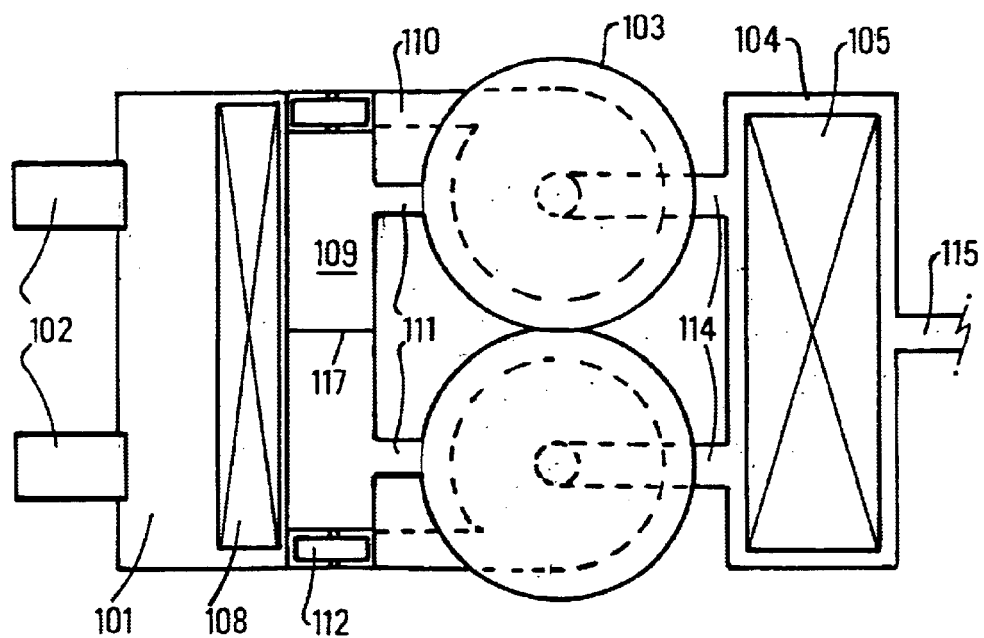

A heat generator generally comprises four principal elements, as shown in FIG. 1: a combustion chamber (1) with a burner/burners (2), a space (3) that is free of tube bundles, possibly partially or completely refractory, in which desulphurisation is carried out, a convection exchange zone (4) with its heat exchange tube bundles (5) and a final dust collector (6) connected to a chimney (not shown) via a connection line (7). Those four elements have a parallelepipedal shape.

That type of heat generator can function both with lost calcitic adsorbents and with regeneratable adsorbents, for example magnesia type adsorbents, such as those claimed in FR-A-2 692 813. Fresh adsorbent is supplied via line (8). It can be mixed with recycled adsorbent from the final dust collector (6) and transported via line (9). The adsorbent is injected substantially at the inlet to the desulphurisation chamber via injector(s) (10). Since it is a powder, the adsorbent is rapidly entrained by the fumes. It traverses the desulphurisation chamber (3), then the convection exchange zone (4), and is finally recovered at the final dust collector. At the outlet from the dust collector, a portion of the adsorbent captured at the desulphurisation chamber via line (9) is returned while the other portion is eliminated or sent for regeneration.

In this configuration, a large proportion of the adsorbent has to be recycled to obtain high desulphurisation yields (typically, 75% to 90%, or even 95% of the $SO_2$ present in the fumes needs to be captured). In a lost calcitic adsorbent boiler, the flow rate of the recycled adsorbent is 3 to 5 times the flow rate of fresh adsorbent, while with regeneratable adsorbents, up to 10 times the regenerated adsorbent flow rate is recycled.

Figure 4:
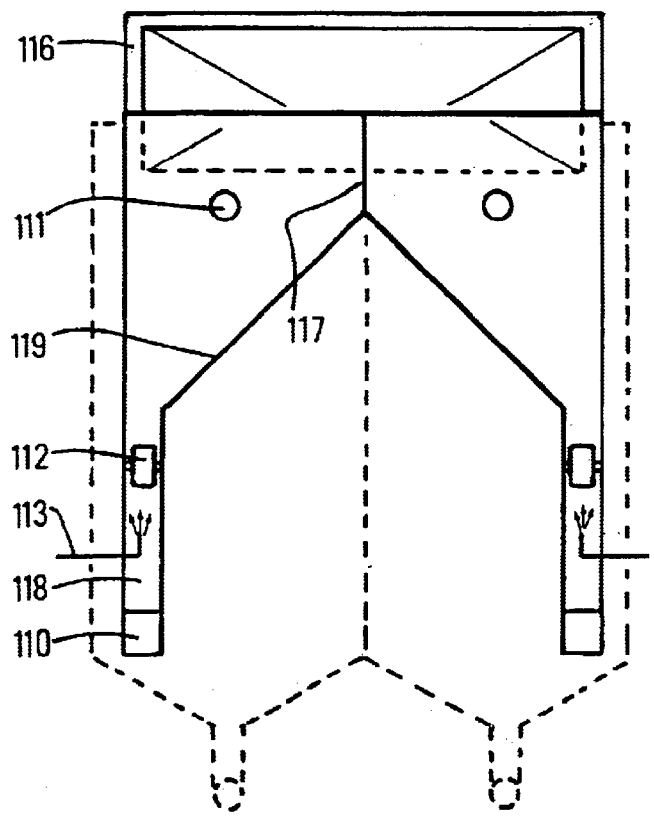

FIGS. 2, 3 and 4 illustrate a first example of a heat generator in which the present process is carried out:

The generator (FIG. 2) comprises, as before, a combustion chamber (101) that is substantially parallelepipedal provided with its burner(s) (102) and comprising at least one exchange zone (not shown) in which at least a portion of the energy released by combustion is recovered, a desulphurisation apparatus (103) in accordance with the configuration described in FIGS. 1 to 5 of FR-A-2 748 402, a convection exchange zone (104), also substantially parallelepipedal, with its bundles of exchange tubes (105) and a final dust collector (106) which can, for example, be an electrostatic filter or bag filter type. The fumes are evacuated to the chimney via line (107).

In more detail, the combustion chamber (101) is equipped with burners that function with sulphur-containing fuels such as heavy fuels. The fumes produced typically have SO2 contents of between 1000 and 10000 mg/Nm$^3$. The combustion chamber has membranous walls that essentially capture by radiation a portion of the heat produced by combustion. On leaving the combustion chamber, the fumes traverse one or more superheating bundles (108) and arrive in a space (109) that acts to supply the desulphurisation apparatus (103). As described in FR-A-2 748 402, the desulphurisation apparatus comprises a peripheral zone for recycling adsorbent, an intermediate zone for desulphurisation and a central zone for evacuating purified fumes to the convection exchange zone (104) via line (114). It is substantially cylindrical in shape and is positioned substantially vertically.

The bulk of the fumes enters the desulphurisation apparatus (103) tangentially via line (110). The remainder of the fumes, which ensure recirculation of the adsorbent to the interior of the desulphurisation apparatus, penetrate into the apparatus (103) via line (111). The fumes supplied to reactor (103) via line (111) can travel along an annular channel not shown in the Figure. The distribution of the fumes between the two inlets can be achieved by means of a valve flap (112) as shown in the figure, or by any equivalent means known to the skilled person. Fresh or regenerated adsorbent can be introduced into the system via injectors (113). These injectors (113) can also be placed on line (111).

Once desulphurised in apparatus (103), the fumes leave said apparatus via line (114) and penetrate into the convection exchange zone (104). They are then directed towards the final dust collector (106) via line (115).

Apparatus (103) can be formed from a metal envelope covered with insulating refractory materials. It can also be constituted by membranous walls partially or completely covered with insulating refractory materials.

In the configuration described in FIG. 2, there is no adsorbent regeneration. It is evacuated or upgraded, or stabilised then discharged. The scope of the invention also encompasses a further embodiment in which all or at least a portion of the adsorbent from the dust collector (electrostatic filter) is regenerated, for example in a filter reactor (not shown in FIG. 2) or using any technique that is known to the skilled person. The regenerated adsorbent can then be returned to the generator via the injectors (113). With respect to an apparatus with no regeneration, this solution can envisage introducing fresh adsorbent only in the form of periodical makeup of a small quantity of product; thus, the consumption of fresh adsorbent is substantially reduced.

FIG. 3 is a top view of a unit that enables the disposition of the different elements to be better understood in the case of a configuration with two CRI desulphurisation reactors (103).

FIG. 4 is a detailed rear view of the space (109) mounted on the bottom of the combustion chamber (101), which acts to supply two CRI reactors (103) with fumes, the reactors being shown in dotted lines. The fumes enter space (109) via opening (116), which is substantially the width of the combustion chamber (101). They are divided into two substantially equal streams by a wall (117), then are directed to two channels (118) by means of two walls (119) which act as a mixer head. The flow adjusting valve (112) is located at the inlet to channel (118). This is followed by injectors for fresh or regenerated adsorbent (113). Channels (118) open onto channels (110), which are connected to two desulphurisation apparatus (103). FIG. 4 also shows that the lines (111) open into the mixer heads created by walls (119), for example.

Figure 5:
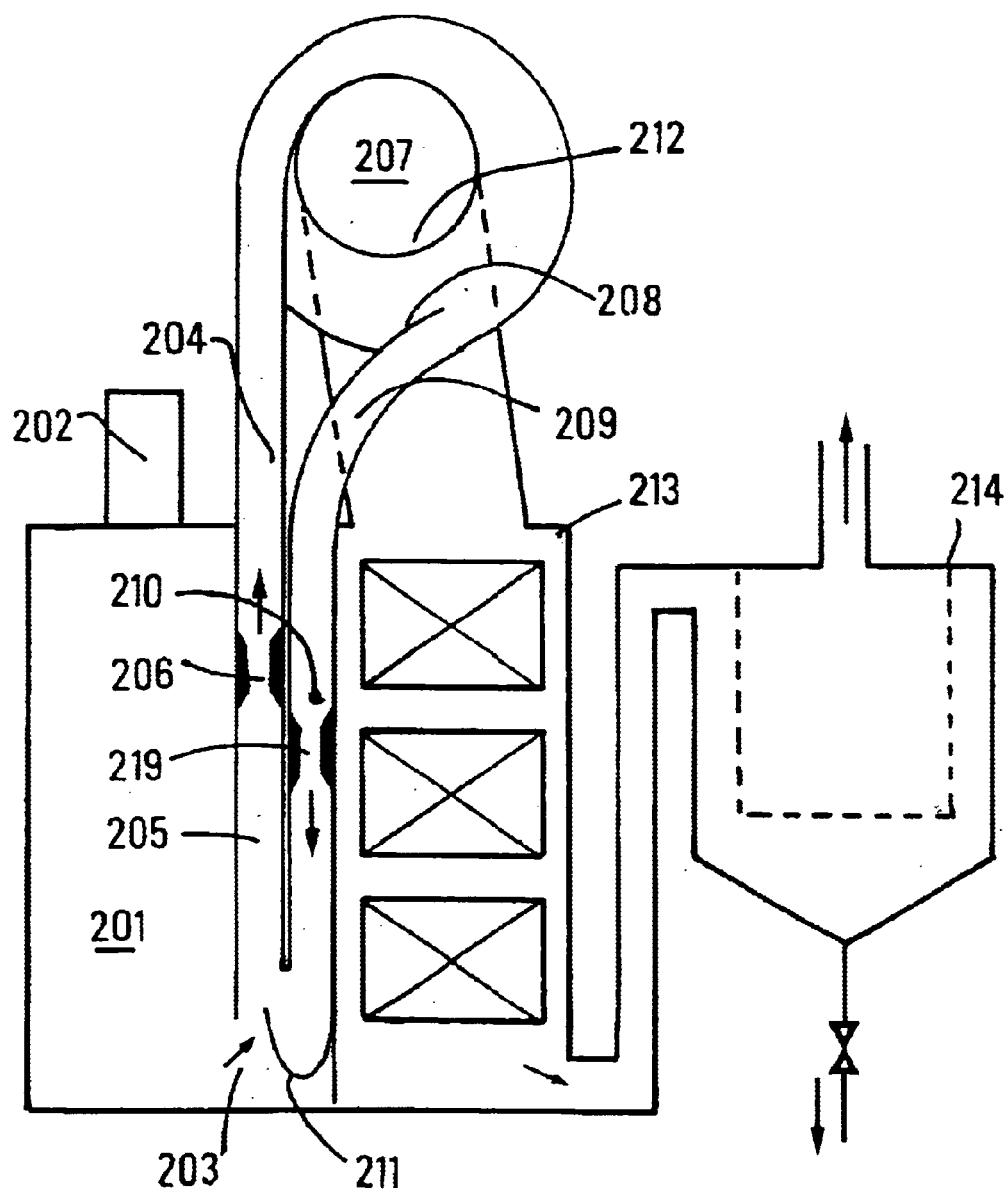
FIG. 5 shows a second embodiment of a heat generator functioning in accordance with the principles of the present invention.

FIG. 5 is a further examples of an implementation of the process of the invention, applying the configurations of FIGS. 6 and 7 of FR-A-2 748 402.

The heat generator comprises a substantially parallelepipedal combustion chamber (201) provided with one or more head burners (202). The fumes leave the combustion chamber (201) via opening (203) and penetrate into rectangular cross sectional space (204), this space being created by membranous walls identical to those that constitute the remainder of the heat generator. Fresh or regenerated adsorbent is introduced into space (204) via injector or injectors (205), which can be in the form of a substantially horizontal injection slope. An apparatus (206) such as a venturi tube or the like can be placed upstream, at the location of or downstream of the injection apparatus to ensure rapid and homogeneous mixing of the adsorbent with the fumes to be treated. The fumes then penetrate into the desulphurisation apparatus proper which, as indicated in FR-A-2 748 402, can be a simple substantially cylindrical volute with the same width as space (204). In the volute, the adsorbent is gradually separated from the fumes by centrifugal force. At the end of the volute, a wall (208) can separate the gas/adsorbent stream into two portions, one rich in adsorbent at the periphery, and a portion that is depleted in adsorbent at the centre. The adsorbent-rich portion penetrates into space (209) for recycling to the inlet to the space (204). The movement of the gas/adsorbent mixture in space (209) can be caused or encouraged by ejectors or the like (210), these ejectors being supplied with vapour or recycled fumes taken from the final dust collector, or any other fluid. An apparatus (219) such as a venture tube can be placed within space (209) to provide mixing. The connection (211) between space (209) and space (204) can be arranged to create a suction effect in said space (209) due to the fumes from the combustion chamber. The adsorbent-depleted fumes leave the desulphurisation apparatus (207) via line(s) (212) and then penetrate into the convection exchange zone (213). They then rejoin the final dust collector (214).

Preferred conditions for carrying out desulphurisation to implement the present invention have been determined. The mean temperature in the desulphurisation apparatus is generally in the range 500° C. to 1300° C. It is preferably in the range 800° C. to 1110° C. if desulphurisation is carried out with lost calcitic adsorbents, while it is in the range 700° C. to 1000° C. for regeneratable adsorbents. Further, the adsorbent flow rates are such that the concentration of solids in the fumes, excluding recycling, is in the range 0.1 to 1000 $g/Nm^3$, preferably in the range 1 to 100 $g/Nm^3$. Advantageously, the gas recycle rate in the apparatus is in the range 1% to 50%, preferably in the range 10% to 50%, and the adsorbent recycle rate (i.e., the ratio between the flow rate of the recirculating adsorbent and the flow rate of the fresh or regenerated adsorbent) is in the range 1 to 50, preferably in the range 2 to 10. Under optimum functioning conditions, the grain size of the adsorbents is in the range 0 to 1000 microns, for example 0.1–1000 microns preferably in the range 5 to 50 microns. Finally, the density of the adsorbent particles is advantageously in the range 100 to 5000 $kg/m^3$, preferably in the range 1000 to 2500 $kg/m^3$.

What is claimed is:

1. A heat generation process with reduced emissions of oxides of sulphur in which:
    a) a sulphur-containing fuel is burned in a combustion zone comprising a heat exchange zone in which at least a portion of the heat is extracted, and effluents or combustion fumes are recovered at a temperature in the range 800° C. to 1200° C.;
    b) the fumes resulting from said combustion, charged with oxides of sulphur, are caused to traverse a space for supplying and distributing the fumes to a desulphurisation apparatus functioning with an internal recycle of a solid oxides of sulphur adsorbent;
    c) the adsorbent is injected into said space;
    d) the fumes are caused to enter said apparatus;
    e) the fumes are caused to penetrate into a convection exchange zone and at least a portion of the heat is extracted from said fumes;
    f) the mixture resulting from steps b) and c) is separated in a gas/solid separation zone and a portion of the gaseous effluent that has been freed of the major portion of the oxides of sulphur and at least partially cooled is evacuated, and said adsorbent particles comprising said sulphur-containing compounds are evacuated, wherein said desulphurisation apparatus comprises a peripheral zone for recycling adsorbent, an intermediate desulphurisation zone into which fumes enter tangentially, and a central zone for evacuating fumes.

2. A process according to claim 1, further comprising after step f), regenerating at least a portion of said adsorbent particles comprising said sulphur-containing compounds and re-injecting the resultant regenerated adsorbent particles into the space acting to supply the desulphurisation apparatus.

3. A process according to claim 1, wherein a calcitic adsorbent is used and desulphurisation is conducted at a mean temperature in the range of 800° C. to 1110° C.

4. A process according to claim 1, wherein a regeneratable magnesian adsorbent is used and desulphurisation is conducted at a mean temperature in the range of 700° C. to 1000° C.

5. A process according to claim 1, wherein after combustion step a), the fumes traverse one or more superheated steam bundles.

6. A process according to claim 1, operated at adsorbent flow rates such that the concentration of solids in the fumes, except for the recycle, is in the range 0.1 to 1000 g/Nm$^3$.

7. A process according to claim 1, operated with a gas recycle ratio in the apparatus in the range of 1% to 50%.

8. A process according to claim 7, wherein the adsorbent recycle ratio is in the range of 1 to 50.

9. A process according to claim 1, wherein the grain size of the adsorbents is in the range of 0.1 to 1000 microns.

10. A process according to claim 1, wherein the adsorbent particles have a density in the range of 100 to 5000 kg/m$^3$.

11. A process according to claim 1, operated at adsorbent flow rates such that the concentration of solids in the fumes, except for the recycle, is in the range 1.0 to 100 g/Nm$^3$.

12. A process according to claim 1, operated with a gas recycle ratio in the apparatus in the range of 10% to 50%.

13. A process according to claim 12, wherein the adsorbent recycle ratio is in the range of 2 to 10.

14. A process according to claim 1, wherein the grain size of the adsorbents is in the range of 5 to 100 microns.

15. A process according to claim 1, wherein the adsorbent particles have a density in the range of 1000 to 2500 kg/m$^3$.

16. A process according to claim 1, wherein said process is operated at adsorbent flow rates whereby the concentration of solids in the fumes, except for the recycle, is in the range 0.1 to 1000 g/Nm$^3$, said process is operated with a gas recycle ratio in the apparatus in the range of 1% to 50%, wherein the adsorbent recycle ratio is in the range of 1 to 50, wherein the grain size of the adsorbents is in the range of 0.1 to 1000 microns, and wherein the adsorbent particles have a density in the range of 100 to 5000 kg/m$^3$.

17. A process according to claim 1, wherein said process is operated at adsorbent flow rates whereby the concentration of solids in the fumes, except for the recycle, is in the range 1 to 100 g/Nm$^3$, said process is operated with a gas recycle ratio in the apparatus in the range of 10% to 50%, wherein the adsorbent recycle ratio is in the range of 2 to 10, wherein the grain size of the adsorbents is in the range of 5 to 50 microns, and wherein the adsorbent particles have a density in the range of 1000 to 2500 kg/m$^3$.

18. A process according to claim 1, further comprising after step f), regenerating at least a portion of said adsorbent particles comprising said sulphur-containing compounds and re-injecting the resultant regenerated adsorbent particles into the space acting to supply the desulphurisation apparatus, and after combustion step a), the fumes traverse one or more superheated steam bundles.

19. A process according to claim 16, further comprising after step f), regenerating at least a portion of said adsorbent particles comprising said sulphur-containing compounds and re-injecting the resultant regenerated adsorbent particles into the space acting to supply the desulphurisation apparatus, and after combustion step a), the fumes traverse one or more superheated steam bundles.

20. A process according to claim 17, further comprising after step t), regenerating at least a portion of said adsorbent particles comprising said sulphur-containing compounds and re-injecting the resultant regenerated adsorbent particles into the space acting to supply the desulphurisation apparatus, and after combustion step a), the fumes traverse one or more superheated steam bundles.

21. A process according to claim 1, wherein said desulfurization apparatus is substantially cylindrical, and wherein said peripheral zone, intermediate desulfurization zone and central zone comprises three at least partially concentric zones.

22. A process according to claim 21, wherein said intermediate desulfurization zone is substantially vertical and said fumes entering tangentially into said intermediate desulfurization zone are caused to enter said intermediate desulfurization zone at least partially at a lower part of said desulfurization zone.

* * * * *